(12) United States Patent
Gal et al.

(10) Patent No.: US 6,487,311 B1
(45) Date of Patent: Nov. 26, 2002

(54) OCR-BASED IMAGE COMPRESSION

(75) Inventors: Yaniv Gal; Alexander Sorin; Andrei Heilper; Eugene Wallach, all of Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/304,861

(22) Filed: May 4, 1999

(51) Int. Cl.[7] .............................. G06K 9/68; G06K 9/62; G06K 9/20; G06K 9/46; H04N 1/32

(52) U.S. Cl. .................. 382/225; 382/218; 382/317; 382/321; 382/233; 358/426.16

(58) Field of Search ................................. 382/224, 225, 382/229, 209, 217, 218, 232, 233, 317, 321, 173, 176, 178, 179; 358/1.2, 1.14, 1.15, 426.16

(56) References Cited

U.S. PATENT DOCUMENTS

| | | | | |
|---|---|---|---|---|
| 5,768,414 A | * | 6/1998 | Jamali | 382/173 |
| 5,778,095 A | * | 7/1998 | Davies | 382/225 |
| 5,884,014 A | * | 3/1999 | Huttenlocher et al. | 358/1.15 |
| 6,011,905 A | * | 1/2000 | Huttonlocher et al. | 358/1.2 |
| 6,020,972 A | * | 2/2000 | Mahoney et al. | 358/1.14 |
| 6,097,845 A | * | 8/2000 | Ng et al. | 382/239 |

OTHER PUBLICATIONS

Avi–Itzhak et al, High Accuracy Optical Character Recognition Using Neural Network with Centroid Dithering, Feb. 1995, IEEE ISBN: 0162–8828, vol. 17, No. 2, pp. 218–224.*

Kia et al, "OCR–Based Rate–Distortion Analysis of Residual Coding"; IEEE Paper ISBN: 0–8186–8183–7, pp. 690–693, Oct. 1997.*

Witten et al, "Textual Image Compression: Two–Stage Lossy/Lossless Encoding of Textual Images"; IEEE Paper ISSN: 0018–9219, vol. 82, Issue 6, pp. 878–888, Jun. 1994.*

Kia et al, "Structural Compression for Document Processing"; IEEE paper ISBN: 0–8186–7282–X, vol. 3, pp. 25–29, Aug. 1996.*

* cited by examiner

Primary Examiner—Joseph Mancuso
Assistant Examiner—Mehrdad Dastouri
(74) Attorney, Agent, or Firm—Darby & Darby

(57) ABSTRACT

A method for compressing a digitized image of a document using optical character recognition (OCR). The method includes performing optical character recognition (OCR) on the digitized image, identifying, based, at least in part, on a result of the performing step, a plurality of classes of characters comprised in the image, each the class of characters having an associated character value and comprising at least one character, pruning each class of characters, thereby producing information describing the plurality of classes of characters and a residual image, and utilizing the information describing the plurality of classes of characters and the residual image as a compressed digitized image in further processing.

Related methods and apparatus are also disclosed.

15 Claims, 6 Drawing Sheets

In a work lately published[1] I have exhibited
peculiar form of Mathematics to the expression of
reasoning. In the present essay I design to offer s
this treatise as may furnish a correct view of the
I shall endeavour to state distinctly those position
distinctions consist, and shall offer a more partic

FOR EACH ONE CLASS IN PLURALITY OF CLASSES OF CHARACTERS:

EXTRACT IMAGE-LOCATION INFORMATION DESCRIBING AT LEAST ONE LOCATION OF AN IMAGE OF AT LEAST ONE CHARACTER FROM THE INFORMATION DESCRIBING THE ONE CLASS

↓

EXTRACT A CHARACTER TEMPLATE FROM THE INFORMATION DESCRIBING THE ONE CLASS

↓

INSERT A CHARACTER AS DESCRIBED BY THE CHARACTER TEMPLATE IN THE RESIDUAL IMAGE AT AT LEAST ONE LOCATION OF AN IMAGE OF AT LEAST ONE CHARACTER WITHIN THE RESIDUAL IMAGE

OCR-BASED IMAGE COMPRESSION

FIELD OF THE INVENTION

The present invention relates to data compression in general, and in particular to lossy data compression systems.

BACKGROUND OF THE INVENTION

Data compression systems are well-known in the art. One well-known way of classifying data compression systems includes the categories of "lossy" and "lossless" compression systems. In lossy compression systems, when an original image is compressed and then decompressed, the resulting image has lost some information and is not identical to the original image. In lossless compression systems, by contrast, compression and decompression restores the original image without any loss. Today, many data compression systems are used for compressing images, although compression of non-image data is also well-known in the art.

Compression ratio is a well-known measure of the efficiency of a data compression system. Generally, compression ratio is taken as equal to the ratio of the size of the uncompressed image to the size of the compressed image; thus, a higher compression ratio is, all other things. being equal, taken to be better than a lower compression ratio. The compression ratio of general-purpose lossless algorithms is believed to be asymptotically bounded by the ratios achieved by Ziv-Lempel type algorithms. For binary images, that is, images having 2-valued pixels usually representing "black" and "white", compression ratio is believed to be bounded by the ratios achieved by G4 type algorithms.

Prior art image compression methods are described in A. N. Netravali and J. O. Limb, "Picture coding: A review", Proc. IEEE, vol. 68, pp. 366–406, March 1980.

The disclosures of all references mentioned above and throughout the present specification are hereby incorporated herein by reference.

SUMMARY OF THE INVENTION

The present invention seeks to provide an improved system of data compression, particularly suited to the compression of images including text data.

The apparatus and method of the present invention use content specific information. Specifically, in the present invention a digital document, also known herein as a "digital image" or "digitized image", is passed through an OCR (optical character recognition) process. Classes of similar characters in the document are identified and, if the characters actually have sufficiently similar shapes, all of the characters in each class are replaced with one character template and an indication of the location of each character, with the template and the location information being stored. Characters thus stored are removed from the image, resulting in a residual image, which is also stored. Typically, both the template and the residual image on the one hand, and the location information on the other hand, are separately compressed, typically using conventional techniques, before storage.

There is thus provided in accordance with a preferred embodiment of the present invention a method for compressing a digitized image of a document, the method including performing optical character recognition (OCR) on the digitized image, identifying, based, at least in part, on a result of the performing step, a plurality of classes of characters included in the image, each the class of characters having an associated character value and including at least one character, pruning each class of characters, thereby producing information describing the plurality of classes of characters, and a residual image, and utilizing the information describing the plurality of classes of characters and the residual image as a compressed digitized image in further processing.

Further in accordance with a preferred embodiment of the present invention the digitized image includes a binary image.

Still further in accordance with a preferred embodiment of the present invention the utilizing step includes storing the information describing the plurality of classes of characters and the residual image.

Additionally in accordance with a preferred embodiment of the present invention the utilizing step includes transmitting the information describing the plurality of classes of characters and the residual image.

Moreover in accordance with a preferred embodiment of the present invention the utilizing step includes compressing the residual image.

Further in accordance with a preferred embodiment of the present invention the utilizing step includes compressing the information describing the plurality of classes of characters.

Still further in accordance with a preferred embodiment of the present invention the pruning step includes producing and storing template-location information describing each class of characters, and erasing each character included in each class of characters from the scanned image, thereby producing a residual image.

Additionally in accordance with a preferred embodiment of the present invention the producing and storing step includes identifying a template image for the class of characters, storing the template image, and storing image-location information for each character included in the class of characters.

Moreover in accordance with a preferred embodiment of the present invention the step of storing image-location information includes storing an identifying code for each character included in the class of characters, and storing location information for each character included in the class of characters.

Further in accordance with a preferred embodiment of the present invention the identifying code includes at least one of the following a standard character encoding code, the standard character encoding code being based, at least in part, on a result of the performing OCR step, and a customized character code, the customized character code being based, at least in part, on a result of the performing OCR step.

Still further in accordance with a preferred embodiment of the present invention the pruning step includes for each one of the plurality of classes of characters performing a shape-matching comparison test between at least two characters included in the one class, and removing from the one class characters which fail the shape-matching comparison test.

Additionally in accordance with a preferred embodiment of the present invention the method also includes aggregating a plurality of characters into at least one additional class of characters, each the addition class of characters being associated with a customized character code, wherein the pruning step and the storing step also operate on the at least one additional class of characters.

Moreover in accordance with a preferred embodiment of the present invention the method also includes scanning the document to produce the digitized image.

Further in accordance with a preferred embodiment of the present invention the compressing the residual image step includes compressing the residual image using a G4 compression method.

There is also provided in accordance with another preferred embodiment of the present invention a compressed digital image including information describing a plurality of classes of characters, and a residual image.

Further in accordance with a preferred embodiment of the present invention the information describing each of the plurality of classes of characters includes template information and image-location information.

Still further in accordance with a preferred embodiment of the present invention the information includes compressed information.

Additionally in accordance with a preferred embodiment of the present invention the residual image includes a compressed residual image.

There is also provided in accordance with another preferred embodiment of the present invention a method for compressing a digitized image of a document, the method including for at least one class of similar characters included in the digitized image, removing all characters included in the class from the image, thus producing a residual image, and producing a template and image-location information describing the all characters included in the class, and compressing at least one of the following the residual image, the template, and the image-location information.

There is also provided in accordance with another preferred embodiment of the present invention a method for expanding a compressed digital image including information describing a plurality of classes of characters and a residual image, the method including for each one class in the plurality of classes of characters extracting image-location information describing at least one location of an image of at least one character from the information describing the one class, extracting a character template from the information describing the one class, and inserting a character as described by the character template in the residual image at the at least one location of an image of at least one character within the residual image.

Further in accordance with a preferred embodiment of the present invention the information describing a plurality of classes of characters includes compressed information, and the method also includes expanding the compressed information.

Further in accordance with a preferred embodiment of the present invention the residual image includes a compressed residual image, and the method also includes expanding the compressed residual image.

There is also provided in accordance with another preferred embodiment of the present invention apparatus for compressing a digitized image of a document, the apparatus including OCR apparatus for performing optical character recognition (OCR) on the digitized image, a class identification unit for identifying, based, at least in part, on a result of the performing step, a plurality of classes of characters included in the image, each the class of characters having an associated character value and including at least one character, a pruning unit for pruning each class of characters, thereby producing information describing the plurality of classes of characters, and a residual image, and a utilization unit for utilizing the information describing the plurality of classes of characters and the residual image as a compressed digitized image in further processing.

There is also provided in accordance with another preferred embodiment of the present invention apparatus for compressing a digitized image of a document, the apparatus including a pruning unit operative, for at least one class of similar characters included in the digitized image, to remove all characters included in the class from the image, thus producing a residual image, and to produce a template and image-location information describing the all characters included in the class, and a compression unit for compressing at least one of the following the residual image, the template, and the image-location information.

There is also provided in accordance with another preferred embodiment of the present invention apparatus for expanding a compressed digital image including information describing a plurality of classes of characters and a residual image, the apparatus including expansion apparatus operative, for each one class in the plurality of classes of characters to extract image-location information describing a location of an image of at least one character from the information describing the one class, to extract a character template from the information describing the one class, and to insert a character scribed by the character template in the residual image at location of an image of at least one character within the residual image.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
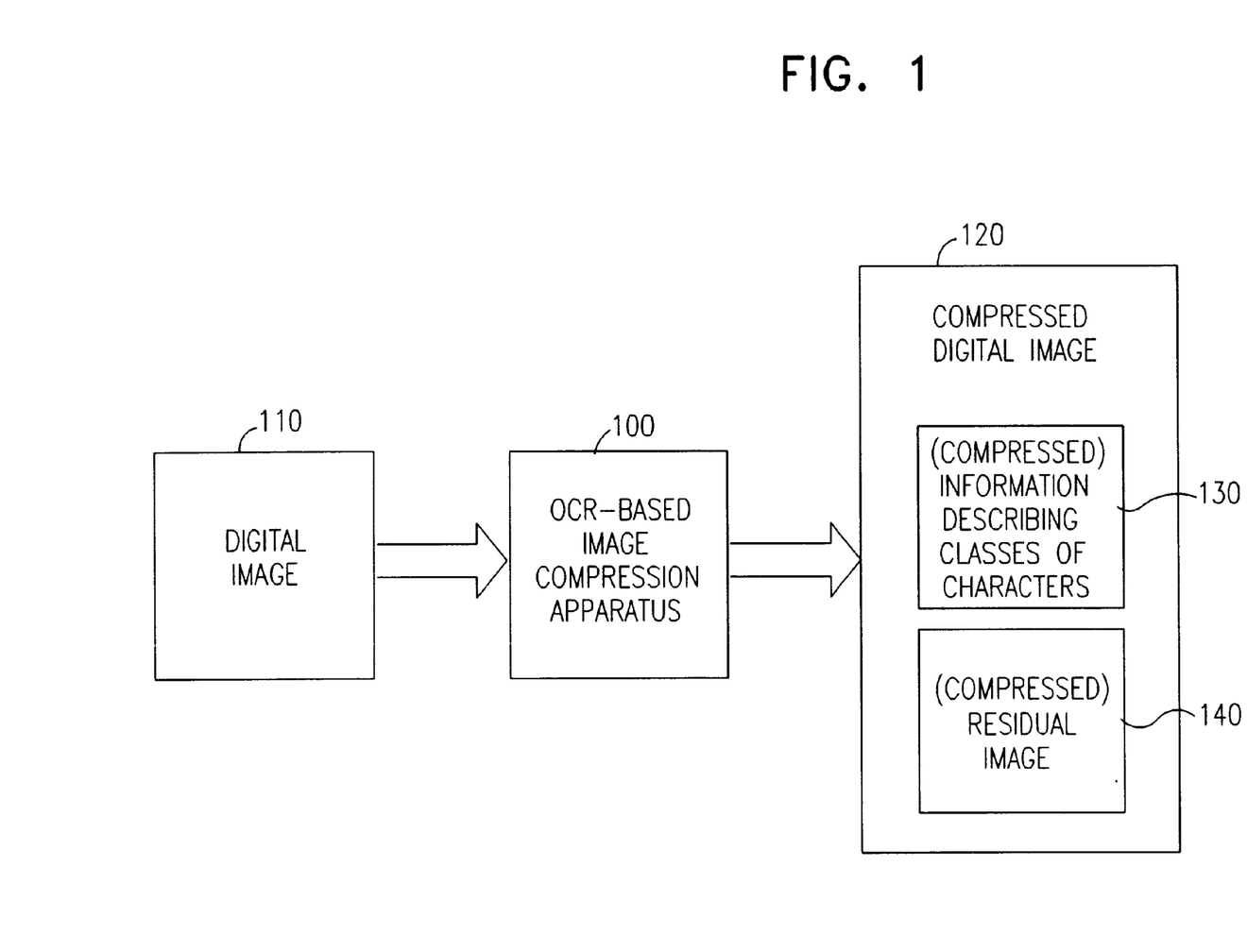
FIG. 1 is a simplified block diagram illustration of an image compression system, including OCR-based image compression apparatus, constructed and operative in accordance with a preferred embodiment of the present invention.

Reference is now made to FIG. 1 which is a simplified block diagram illustration of an image compression system, including OCR-based image compression apparatus, constructed and operative in accordance with a preferred embodiment of the present invention.

The system of FIG. 1 comprises optical character recognition based (OCR-based) image compression apparatus 100. OCR-based image compression apparatus 100 is typically implemented in a combination of general-purpose computer hardware and custom software, as is well-known in the art, but may also be implemented in custom hardware for optimum performance.

OCR-based image compression apparatus 100 is preferably operative to accept a digital image 110 as input, the digital image 100 being formatted according to any appropriate digital image encoding method or standard, as is well-known in the art. Typically, the digital image 110 comprises a binary image, in which each pixel has two possible values representing typically black and white; alternatively, a unit (not shown) for converting the digital image 110 into a binary image may be comprised in the OCR-based image compression apparatus 100.

OCR-based image compression apparatus 100 is preferably operative to process its input, as described in more detail below with reference to FIG. 2, and to produce a compressed digital image 120. The compressed digital image 120 typically comprises information 130 describing classes of characters. The compressed digital image 140 also typically comprises a residual image 140, the residual image 140 typically comprising portions of the digital image 110 which are not represented by the information 130.

It is appreciated that the OCR-based image compression apparatus 100 may, without the other elements of FIG. 1, comprise a preferred embodiment of the present invention. It is also appreciated that the compressed digital image 120 may, without the other elements of FIG. 1, comprise a preferred embodiment of the present invention.

The operation of the system of FIG. 1 is now briefly described. Reference is now additionally made to FIG. 2, which is a simplified block diagram illustration of a preferred implementation of the OCR-based image compression apparatus of FIG. 1.

OCR-based image compression apparatus 100 typically comprises optical character recognition (OCR) apparatus 150. OCR apparatus 150, upon receipt of the digital image 110, is typically operative to perform optical character recognition (OCR) on the digital image 110. OCR, as is well-known in the art, is typically operative to identify, in a digital image, representations of characters that are comprised in the image. Any appropriate OCR apparatus and/or method may be used as the OCR apparatus 150. One possible example of an appropriate OCR apparatus 150 is the IBM-HRL OCR interface.

Typically, performing optical character recognition in OCR apparatus 150 provides as output a result comprising a list of characters including, for each character found in the digital image 110, the likely value of each recognized character in some standard code such as ASCII, a degree of confidence with which each character has been recognized, and the position of each character in the digital image 110.

Figure 2:
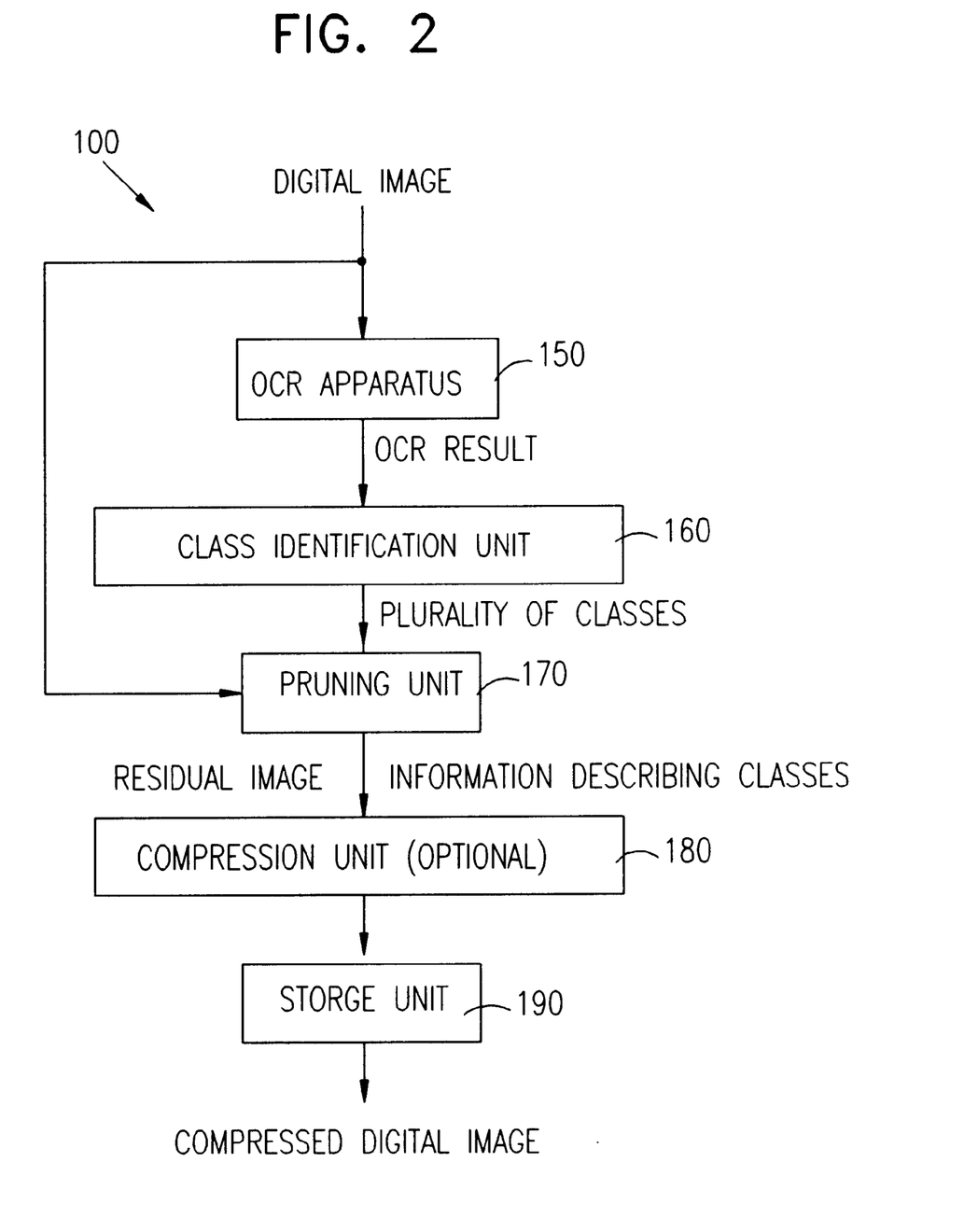
FIG. 2 is a simplified block diagram illustration of a preferred implementation of the OCR-based image compression apparatus of FIG. 1.

The apparatus of FIG. 2 also typically comprises a class identification unit 160. The class identification unit 160 is typically operative to receive the result produced by OCR apparatus 150 and to identify a plurality of classes of characters, each class of characters being associated with the same standard code.

The apparatus of FIG. 2 also typically comprises a pruning unit 170. The pruning unit 170 typically receives the plurality of classes from the class identification unit 160 and the digital image 110 and is typically operative to further analyze each of the plurality of classes, to prune therefrom characters whose fit to the other members of the class is doubtful, and to produce as output information describing the pruned classes and a residual image. The residual image, further described below, is typically produced from the digital image 110 by removing therefrom all characters which are included in any of the plurality of classes after operation of the pruning unit 170.

Preferably, the apparatus of FIG. 2 includes a compression unit 180, which may perform any appropriate compression method on the residual image and the information describing the classes, received from the pruning unit 170. Preferably, compression is performed separately on the residual image and on one or more templates comprised in the information describing the classes on the one hand, collectively referred to as "image information for compression"; and in location information describing characters, on the other hand. Typically, the image information for compression is compressed using a G4-type compression method, while the other information is compressed using an LZW-type compression method.

The apparatus of FIG. 2 typically also includes a utilization unit for utilizing the output of the compression Unit 180 or the pruning unit 170. By way of example only, a storage unit 190 is shown in FIG. 2 as the utilization unit, the storage unit 190 being typically operative to store the residual image and the information describing the classes, which were compressed by the optional compression unit 180, if present, as a compressed digital image. Alternatively, and further by way of example only, the utilization unit may comprise one or more of the following: the compression unit 180; an appropriate transmission unit for transmitting the output of the compression unit 180 or the pruning unit 170 to other apparatus, including local or remote apparatus. Without limiting the generality of the foregoing, it is appreciated that the utilization unit may, in some preferred embodiments, include only the compression unit 180.

Figure 3A:
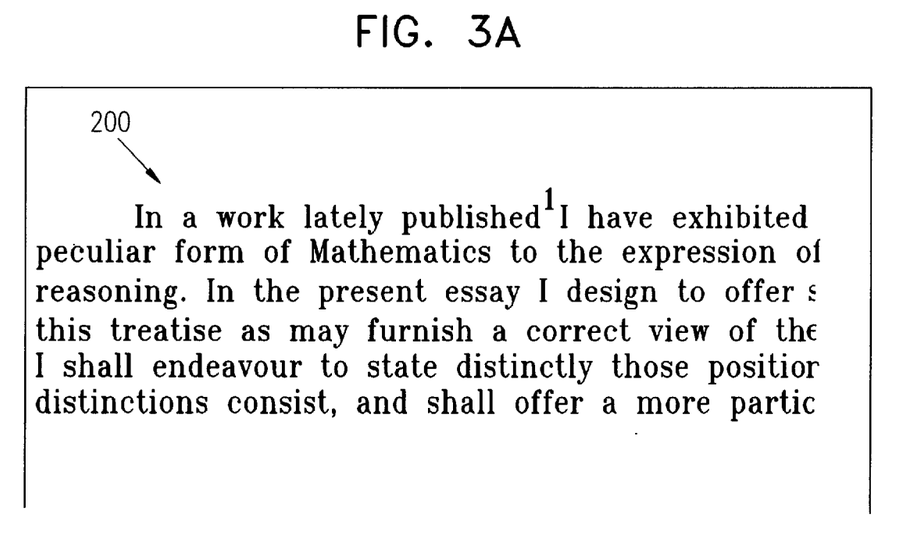
FIG. 3A is a simplified pictorial illustration of a typical example of a digital image suitable for use in the system of FIG. 1.
Figure 3B:
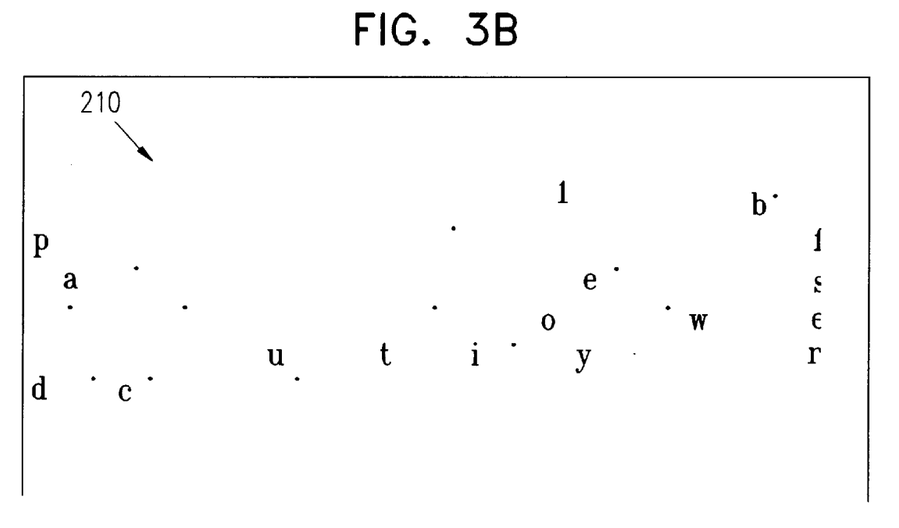
FIG. 3B is a simplified pictorial illustration of a typical example of the residual image of the system of FIG. 1.

Reference is now made to FIG. 3A, which is a simplified pictorial illustration of a typical example of a digital image suitable for use in the system of FIG. 1, useful for understanding the present invention. The example of FIG. 3A comprises a digital image 200, shown as an image of text including both clear, well-formed characters and other characters which may appear only partially or be unclear or not well-formed. Reference is now additionally made to FIG. 3B, which is a simplified pictorial illustration of a typical example of the residual image of the system of FIG. 1, useful for understanding the present invention. The example of FIG. 3B comprises a residual image 210, which might be a typical residual image, before compression, produced by the system of FIG. 1 when presented with the digital image 200 of FIG. 3A as input.

Figure 4:
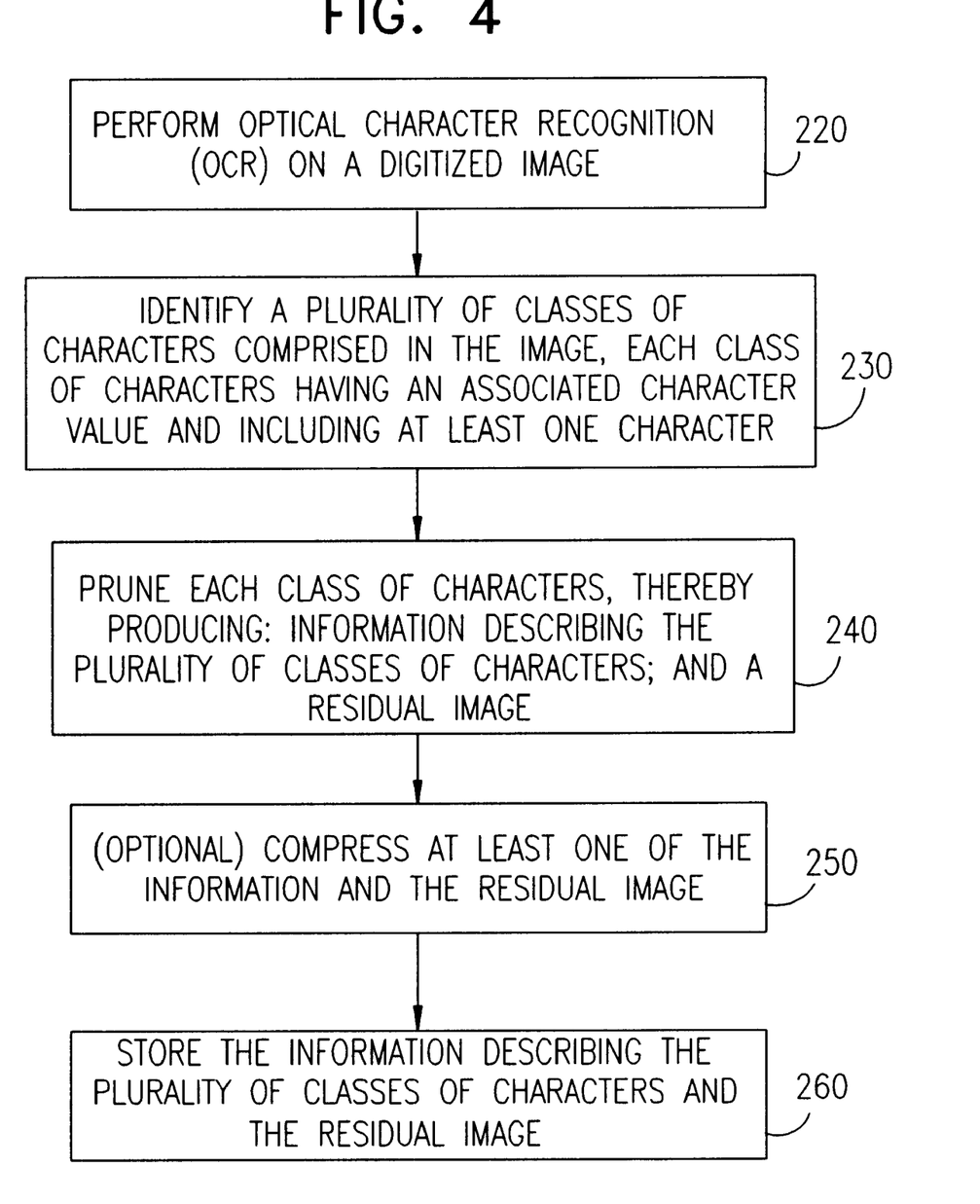
FIG. 4 is a simplified flowchart illustration of a preferred method of operation of the system of FIG. 1.

Reference is now made to FIG. 4, which is a simplified flowchart illustration of a preferred method of operation of the system of FIG. 1. The system of FIG. 4 typically comprises the following steps:

OCR is performed on a digitized image (step 220). A plurality of classes of characters comprised in the image are identified, each class of characters having an associated character value and each class including at least one character (step 230). One or more characters, typically characters whose confidence of identification in step 220 is below a certain predefined level, preferably a predefined level depending on the precise type of OCR being used, may not be comprised in any class.

Each class of characters is pruned (step 240), thereby producing both information describing the plurality of classes of characters and a residual image. At the beginning of step 240 or at the end of step 230, an image-matching filtering process is applied to verify that characters in the same class, determined in step 220 to have the same ASCII value, have matching shapes. The following, by way of example only, is one preferred method of image-matching filtering, it being appreciated that other methods may also be used:

The digital representations of two images to be compared are matched up on top of each other and compared pixel by pixel, with corresponding pixels being logically ANDed together and summed. The two images are also offset in the x and y directions from each other with a variable offset ($\Delta X$, $\Delta Y$) and compared by the same pixel-by-pixel method in each offset position, with $\Delta X$ and $\Delta Y$ typically ranging from 0–2 pixels. For the sake of simplicity of description, let a first image be denoted by A, a second image be denoted by B, and let B be considered to be offset relative to the stationary A. Than the result of the image-matching filtering is then given by:

$$\text{match} = \text{max-over-all-offsets pixel-sum} (A, (B+\text{offset}))^2 / \text{pixel-sum}(A) \cdot \text{pixel-sum}(B)$$

where "max-over-all-offsets" indicates the maximum over all values of offset.

Typically, in the image-matching filtering process some threshold value of match is defined, with two characters A and B whose match value is above the threshold level being considered sufficiently close for a match. It is appreciated that match, based on the above definition, has a possible value ranging from 0, with no common pixels found, to 1, with the two images being identical. Typically, for strict filtering, which would be appropriate for steps 230 or 240, a threshold value of 0.80 to 0.85 may be used. If permissive filtering were desired, a threshold value of 0.70–0.75 may be used. Typically, strict filtering is utilized in the present invention. However, it is appreciated that, in practice, the threshold value might be varied, depending on a variety of specific attributes of the equipment being used and the documents being processed, to maximize compression ratio with a minimum of errors.

Typically, characters which fail the image-matching filtering process are removed from their class, so that the characters remain in the residual image. Each class of characters is then removed from the residual image, as described above, and information describing the class of characters is generated.

In an additional operation which may be comprised in step 240, characters whose confidence of identification in step 220 was below the predefined level may be pairwise matched and processed with the image-matching filtering method described above, in an attempt to identify additional characters, matching according to strict filtering. Matching characters found may be removed from the residual image and information describing the characters may be generated using a method similar to that described above in the case of each class of characters.

Typically, in order to receive a good degree of compression, one or both of the information describing the class of characters and the residual image is compressed (step 250). Appropriate methods of compression are described above with reference to FIG. 2.

Information describing the plurality of classes of characters and the residual image are utilized in any appropriate way, such as, for example: by being stored (step 260), typically in any appropriate storage medium; or by transmitted, typically by any appropriate transmission medium. It is appreciated that step 250 may be comprised in step 260, and may by itself comprise appropriate utilization.

Figure 5:
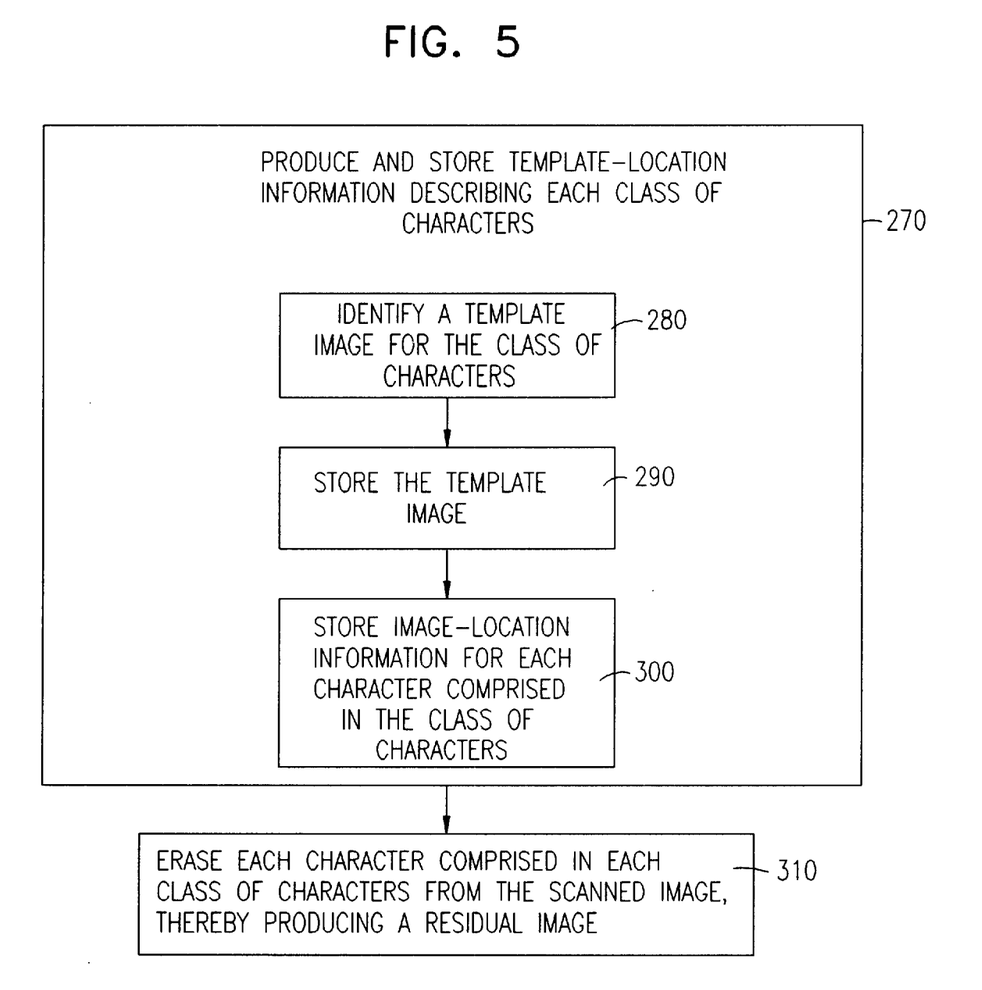
FIG. 5 is a simplified flowchart illustration of a preferred implementation of step 240 of FIG. 4.

Reference is now made to FIG. 5, which is a simplified flowchart illustration of a preferred implementation of step 240 of FIG. 4. The method of FIG. 5 comprises the following steps:

Template-location information describing each class of characters is produced and stored (step 270). Typically, in step 270, one image in the class of characters, typically the image identified in step 220 of FIG. 4 with the highest confidence of any character in the class, is identified as a template image for the class (step 280). The template image is stored (step 290). Image location information, indicating the location within the image of every character in the class, is also stored (step 300). Preferably, the location information is stored in an efficient form, such as a differential form showing the location of each character relative to the previous character.

Each character in each class of characters is erased from the scanned image, thereby producing a residual image (step 310). The erasing may be performed by subtracting the image of the removed character, or by any other appropriate means. It is appreciated that optimization techniques may be used in step 310 to make subsequent compression of the residual image more effective. In particular, for example, if removal of the image of a character creates a broken line in the residual image, it is appreciated that filling in the line to be unbroken may be preferable, because unbroken lines are often compressed by compression methods in a more efficient way than broken lines.

Figure 6:
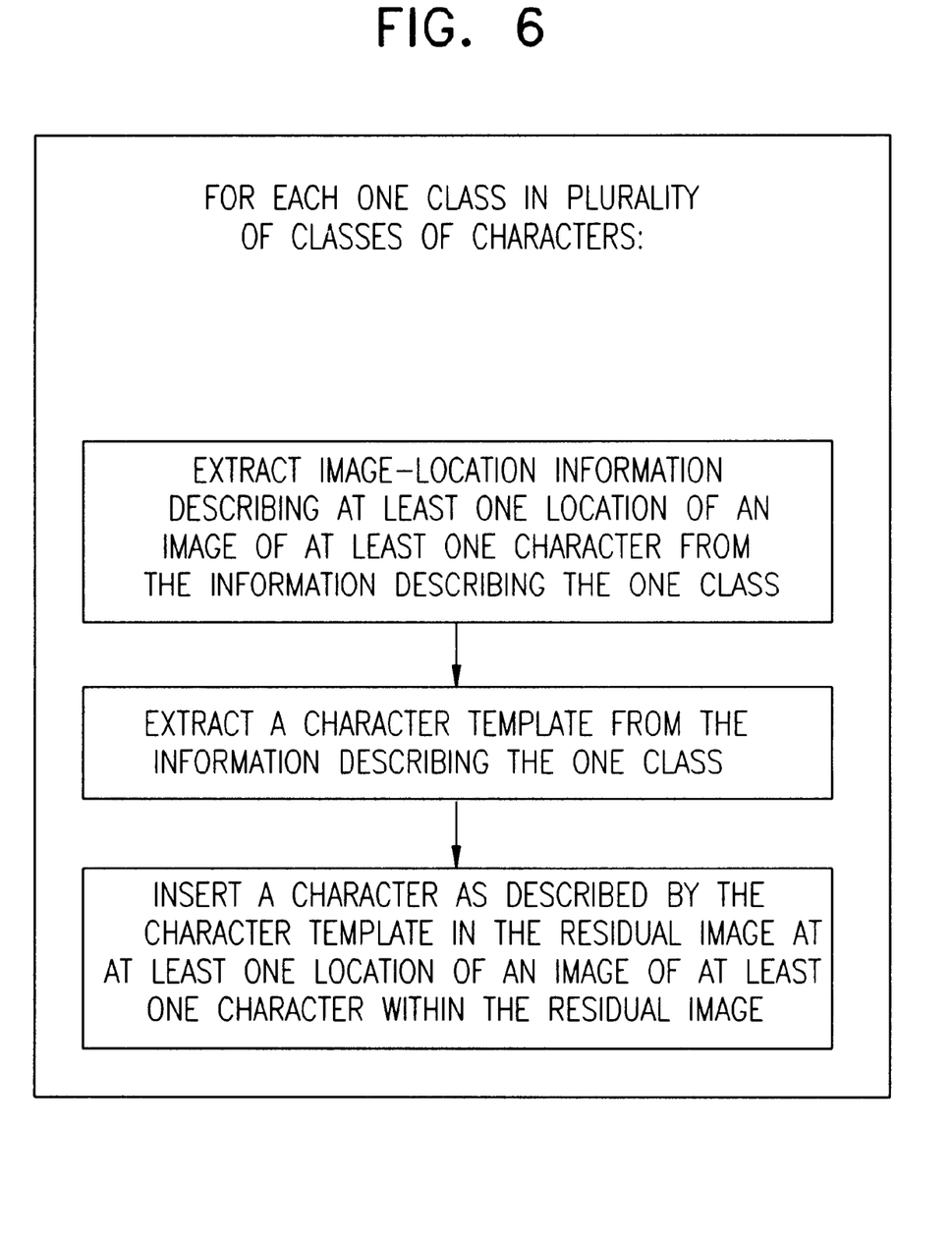
FIG. 6 is a simplified flowchart illustration of a preferred method of expanding a compressed image produced by the system of FIG. 1.

Reference is now made to FIG. 6, which is a simplified flowchart illustration of a preferred method of expanding a compressed image produced by the system of FIG. 1, and/or the method of FIG. 4. The method of FIG. 6 is self-explanatory in light of the above discussion of FIGS. 1–5.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow.

What is claimed is:

1. A method for compressing a digitized image of a document, the method comprising:

performing optical character recognition (OCR) on the digitized image so as to assign alphanumeric character values to characters comprised in the image;

identifying, based, at least in part, on a result of the performing step, a plurality of classes of the characters comprised in the image, such that the characters in each said class have a common one of the alphanumeric character values assigned thereto by the OCR in the performing step, each said class comprising at least one character;

pruning each class of characters, thereby producing:
   information describing the plurality of classes of characters; and
   a residual image; and utilizing the information describing the plurality of classes of characters and the residual image as a compressed digitized image in further processing, wherein the performing step comprises assigning respective confidence levels to the characters with respect to the character value assigned thereto, and wherein the identifying step comprises excluding from the classes the characters whose confidence levels are below a predefined level, and wherein the utilizing step comprises selecting from each of the classes one of the characters whose respective confidence level is highest to serve as a template for the class, and wherein the digitized image is decompressed by using the template in place of each of the characters in the class.

2. A method according to claim 1 and wherein the digitized image comprises a binary image.

3. A method according to claim 1 and wherein the utilizing step comprises storing the information describing the plurality of classes of characters and the residual image.

4. A method according to claim 1 and wherein the utilizing step comprises transmitting the information describing the plurality of classes of characters and the residual image.

5. A method according to claim 1 and wherein the utilizing step comprises compressing the residual image.

6. A method according to claim 1 and wherein the utilizing step comprises compressing the information describing the plurality of classes of characters.

7. A method according to claim 1 and wherein the pruning step comprises:

producing and storing template-location information describing each class of characters; and erasing each character comprised in each class of characters from the scanned image, thereby producing a residual image.

8. A method according to claim 7 and wherein the producing and storing step comprises:

identifying a template image for the class of characters;

storing the template image; and storing image-location information for each character comprised in the class of characters.

9. A method according to claim 8 and wherein the step of storing image-location information comprises:

storing an identifying code for each character comprised in the class of characters; and storing location information for each character comprised in the class of characters.

10. A method according to claim 9 and wherein said identifying code comprises at least one of the following:

a standard character encoding code, the standard character encoding code being based, at least in part, on a result of the performing OCR step; and a customized character code, the customized character code being based, at least in part, on a result of the performing OCR step.

11. A method according to claim 1 and wherein the pruning step comprises:

for each one of said plurality of classes of characters:

performing a shape-matching comparison test between at least two characters comprised in said one class; and removing from said one class characters which fail the shape-matching comparison test.

12. A method according to claim 1 and also comprising:

aggregating a plurality of characters into at least one additional class of characters, each said addition class of characters being associated with a customized character code, wherein the pruning step and the storing step also operate on the at least one additional class of characters.

13. A method according to claim 1 and also comprising:

scanning the document to produce the digitized image.

14. A method according to claim 5 and wherein the compressing the residual image step comprises:

compressing the residual image using a G4 compression method.

15. Apparatus for compressing a digitized image of a document, the apparatus comprising:

OCR apparatus for performing optical character recognition (OCR) on the digitized image so as to assign alphanumeric character values to characters comprised in the image;

a class identification unit for identifying, based at least in part, on the alphanumeric character values output by the OCR apparatus, a plurality of classes of the characters comprised in the image, the characters in each said class of characters having a common one of the alphanumeric character values assigned thereto by the OCR apparatus and each said class comprising at least one character;

a pruning unit for pruning each class of characters, thereby producing:

information describing the plurality of classes of characters; and a residual image; and a utilization unit for utilizing the information describing the plurality of class of characters and the residual image as a compressed digitized image in further processing, wherein the OCR apparatus is arranged to assign respective confidence levels to the characters with respect to the character value assigned thereto, and wherein the class identification unit is arranged to exclude from the classes the characters whose confidence levels are below a predefined level, and wherein the utilization unit is arranged to select from each of the classes one of the characters whose respective confidence level is highest to serve as a template for the class, wherein the digitized image is decompressed by using the template in place of each of the characters in the class.

* * * * *